(12) United States Patent
Lefebvre Du Grosriez et al.

(10) Patent No.: US 7,026,037 B2
(45) Date of Patent: Apr. 11, 2006

(54) ABSORBENT PAPER PRODUCT SUCH AS NAPKIN OR HANDKERCHIEF, METHODS FOR MANUFACTURING SUCH A PRODUCT, AND APPARATUS IMPLEMENTING SUCH METHODS

(75) Inventors: Carol Lefebvre Du Grosriez, Oberhergheim (FR); Jean-Louis Neveu, Colmar (FR)

(73) Assignee: Georgia Pacific France, Kunheim (FR)

( * ) Notice: Subject to any disclaimer, the term of this patent is extended or adjusted under 35 U.S.C. 154(b) by 0 days.

(21) Appl. No.: 09/839,407

(22) Filed: Apr. 23, 2001

(65) Prior Publication Data

US 2002/0060000 A1    May 23, 2002

(30) Foreign Application Priority Data

Apr. 28, 2000  (EP) .................. 00401192

(51) Int. Cl.
    *B32B 3/00*    (2006.01)
(52) U.S. Cl. .............. 428/156; 428/153; 428/154; 428/157; 428/166; 428/178; 162/132

(58) Field of Classification Search ............... 428/156, 428/157, 161, 166, 143, 153, 154, 162, 178, 428/68; 162/132, 133, 112, 113, 115, 117
See application file for complete search history.

(56) References Cited

U.S. PATENT DOCUMENTS

| 2,020,668 | A | * | 11/1935 | Wandel | 428/84 |
| 3,954,554 | A | * | 5/1976 | Curry et al. | 162/104 |
| 4,307,141 | A | * | 12/1981 | Walbrun | 428/132 |
| 4,320,162 | A | * | 3/1982 | Schulz | 156/209 |
| 5,698,291 | A | * | 12/1997 | Clark et al. | 428/152 |
| 6,214,146 | B1 | * | 4/2001 | Merker | 156/183 |

* cited by examiner

*Primary Examiner*—Alicia Chevalier (57) ABSTRACT

The invention relates to an absorbent paper product, such as a napkin or tissue, including at least two tissue paper plies which are superposed and joined, cut or precut into a desired format and connected to one another at least over a segment of a peripheral zone. The plies are joined along the segment by marking patterns without resort to glueing and at least one ply is fitted with embossing patterns in a central zone. The invention applies to sanitary and household papers, in particular disposable napkins and tissues.

2 Claims, 7 Drawing Sheets

ABSORBENT PAPER PRODUCT SUCH AS NAPKIN OR HANDKERCHIEF, METHODS FOR MANUFACTURING SUCH A PRODUCT, AND APPARATUS IMPLEMENTING SUCH METHODS

FIELD OF THE INVENTION

The invention relates to an absorbent paper product for sanitary and household uses. More specifically, it concerns products cut or precut into such formats as paper handkerchiefs, hereafter tissues, disposable table napkins, or similar products. These products include at least two superposed tissue paper plies which are joined to each other in any known manner.

BACKGROUND OF THE INVENTION

In the description below, the terms "marking" and "embossing" take the following meanings.

"Marking" involves compressing some portions of a sheet including several plies of tissue paper by forming compacted zones and significantly reducing the ply's thickness in these zones without however forming corresponding salients on the opposite side. When several plies, in particular two plies, are "marked" jointly, they will be combined and joined.

A marked product includes compressed zones of lesser thickness consisting of the marking patterns of the product.

"Embossing" involves creating one or several superposed tissue paper plies, salients on a first side with corresponding troughs on the opposite side of the plies, while increasing the thickness of the ply or superposed plies. The salients and troughs so made constitute embossing patterns at the surface of the paper products. This technique as well allows joining of the plies.

Most of the paper napkins presently on the market are connected by embossing at the edges, with entailed thickness in the joined peripheral zones.

Among the table napkins recently appearing on the market, some are mechanically joined at the edges of the plies and exclusively by marking.

One of the marking procedures consists in moving two tissue paper plies between an engraved steel cylinder and a smooth mating steel cylinder, the engraved cylinder has salients most of the time in the form of tips at that portion of its surface corresponding to the napkin's edges. The compression applied by the cylinders suffices to join the plies. The resultant cut product includes, on one of its surfaces, edges having compressed or compacted portions wherein the thickness is substantively reduced. There is no corresponding salient on the other product side. These products are characterized by the lack of excess thickness. Their central zone is flat, without excess thickness at its center. They lack bulk and "touch", however, which are desired properties for products used in wiping the skin.

Another marking technique to join the tissues' edges is described in the patent application WO 95/274290 A.

This technique consists in marking each side of the product by using two engraved cylinders each fitted with salient parts in the form of tips, the tips of one cylinder being configured tip-to-tip with the tips of the other cylinder. The two plies are therefore joined by marking and by the point pressure applied by the cylinders. The two outer product sides at these points are recessed inward the sheet at the points, each point on one side matching another point on the other side.

This procedure entails very high accuracy and rigorous control.

The presently manufactured products incur the same drawbacks as those described above relating to conventional marking, namely that they are flat in the central zone.

European Patent Application 0 674 990 A describes embossed, paper table napkins. This embossing procedure allows creating, over a portion of the surface of each ply constituting the product, salient patterns with corresponding troughs on the opposite ply sides. As a result, the product is an embossed one and of greater thickness.

In this prior art of the above European Patent Application 0 674 990 A, there are three possibilities: embossing only the napkin's edges, embossing the full surface of the napkin, and embossing the edges with other embossing points selected in the central part between the edges.

In the first mode, once they are folded into four panes, the napkins incur some asymmetry. When stacked and wrapped, the packs tend to warp. Moreover, the napkins' touch is unpleasant near the edges because of the asymmetric embossing salients.

In the second mode, it is difficult to implement the high compressions required to emboss the full napkin surface, and consequently the mechanical junction between the plies is degraded, while there is also loss of softness because of the full surface embossing.

The third mode is a compromise between the other two, resorting to selective distribution of the embossing points in the napkin's central portion.

However, the drawbacks are a combination of those cited in the first and second modes.

The solution proposed in this prior art application EP 0 674 990 A to circumvent these various drawbacks is a napkin with functional embossing comprising an edge embossing and a decorative embossing pattern situated at one of the folds opposite the edge embossing. An unembossed wiping surface remains. In fact, the napkin portions that constitute the inner folded edges are embossed in order that the product, once it has been folded, is of fairly constant thickness, thereby avoiding the warping problems of the stacked napkin packs.

Patent Application WO 94/12343 A discloses another joining technique at the edges of a cut product, such as a tissue. This technique includes junction by embossing and glueing, the ply junction being implemented by glueing the edges. However, the manufacture of such products is problematic the moment an adhesive is used. Moreover, the adhesive will stiffen the product.

OBJECTIVES AND BRIEF DESCRIPTION OF THE INVENTION

The objective of the invention is palliation of the plurality of above cited drawbacks by providing an absorbent paper product which is cut or precut into a given format and which comprises at least two well joined plies, the product being flexible, offering bulk and good touch in its central portion while also being pleasant to touch. The goal is to attain products of greater perceived thickness, as compared to most conventional products, the latter being comparatively flat in their central zone. This perceived thickness in particular may result from the thickness differential between the peripheral napkin zone and its central zone.

Another objective of the invention is to provide simple methods to manufacture the product of the invention and allow joining various kinds and types of patterns.

Another objective of the invention is to provide apparatus to implement the methods of the invention.

As a remainder, the terms "marking" and "embossing" used in the following description mean the following:

"Marking" involves compressing a certain portion of one or more tissue paper plies by forming compacted zones and substantively reducing the ply thickness in these zones without entailing corresponding salients on the opposite side. When several, in particular two plies are marked jointly, they are joined and linked in the compacted, i.e. marked zones, and this is the case in the present invention.

A marked product includes compressed zones of lesser thickness constituting the product's marking patterns.

The invention also encompasses several marking methods, but excludes marking combined with glueing.

The most conventional edge marking procedure consists in marking and connecting at least two plies by moving these two plies between a hard, for example steel engraved cylinder of which the engraved patterns are of tips, and a smooth mating cylinder, also made of a hard, steel type material, and applying adequate compression.

Another procedure consists in marking a filigree-type pattern on an absorbent paper product by stress-deforming the product which is made to pass at least once between a hard and undeforming cylinder having linear engraved patterns and a mating cylinder of at least 40 Shore D hardness.

A product so marked offers the feature of glossy, smooth, marked and translucent surfaces forming filigrees, the unmarked surfaces being matte. Both the product and the method are described in detail in Patent Application WO 97/20107 A.

"Embossing" involves creating salients on a first side with matching troughs on the opposite side of one or several superposed tissue paper plies by increasing the thickness of the ply or the superposed plies. The salients and troughs so made constitute embossings on the paper products' surfaces.

Various embossing modes are feasible. However the invention excludes combining embossing with glueing in the case of several plies being embossed.

One of the embossing modes includes in moving one or several plies between a hard engraved cylinder fitted with male engraving patterns and a hard engraved mating part fitted with corresponding female engraving patterns.

In another procedure, one or more plies are made to move between a hard, for example steel, engraved cylinder fitted with male engraving patterns and a mating cylinder made of a deforming material, such as paper or rubber. The mating cylinder deforms to hug the male engraving patterns. The result so attained is close to that described in the above procedure.

There are other embossing procedures which combine several hard and undeforming engraved cylinders with unengaged deforming cylinders. In this manner, several plies can be embossed and then joined.

Depending on the relative position of the engraved cylinders, the salient portions of the embossing patterns of one ply may be positioned opposite the salient portions of the embossing patterns of another ply. Such mutual positioning is called "tip-to-tip". They also may be offset relative to the salient portions of the embossing patterns of the other ply. This configuration is called "nested." A hollow portion of a ply's embossing pattern is then configured within a salient portion of the embossing pattern of the other ply.

Any kind of embossing is applicable in the present invention.

Preferably, the embossing mode used includes moving one or more plies between an embossing, or engraved, hard, for example steel, cylinder fitted with engraved patterns and a mating cylinder, or smooth receiving cylinder, made of a deforming material, such as rubber.

In general, each ply is embossed separately and then the two embossed plies are superposed. However, the two plies also may be embossed jointly and be joined partly by the embossing.

In one embodiment of the invention described further below, ply marking may be carried out on two superposed plies of which one already is embossed and comprises embossing patterns. In this case, the marking patterns are partly or wholly identical with the embossing patterns.

One objective of the present invention is an absorbent paper product such as a napkin or tissue comprising at least two tissue paper superposed plies which are joined, cut or precut into the desired format and which are interconnected along at least part of a peripheral zone.

In an essential feature of the invention, the plies are linked along the part by marking patterns, without glueing, and at least one ply is fitted with embossing patterns in the central zone.

In another feature of the invention, the two plies comprise identical or different embossing patterns in the central zone.

In an advantageous feature of the invention, at least one of the plies comprises only marking patterns in the peripheral zone.

In the peripheral zone of another advantageous feature of the invention, at least one of the plies is fitted with marking patterns partly or wholly identical with the embossing patterns.

In yet another feature of the invention, the marking patterns in the peripheral zone are filigrees.

In a preferred feature of the invention, the central zone of one ply is fitted with a decoration including a combination of embossed portions and unembossed portions.

Another objective of the invention is a manufacturing method for the product of the invention, characterized in that it includes in (a1) embossing a first tissue paper ply between a first engraved cylinder and a second mating cylinder at least in the central format zone, (b) superposing a second ply and joining the two plies, along a peripheral format zone, by marking between a first engraved or unengraved cylinder in the zones corresponding to the peripheral zone and a second hard, respectively unengraved and engraved cylinder in the zones corresponding to the peripheral zone, in a manner to join the plies to each other, and (c) cutting or precutting into formats.

In another essential feature of the invention, the method comprises an additional stage (a2) between the stages (a1) and (b), wherein the second ply is embossed between the second hard cylinder, which is engraved at least in a zone corresponding to the format central zone, and a second mating cylinder.

Another objective of the invention is a method characterized by:

(a1) simultaneously embossing first and second plies between a first engraved cylinder, fitted with engraved zones corresponding to the embossing patterns of the central format zone and a first deforming mating cylinder fitted with deforming unengraved surface zones or with engraved surface zones of steel or the like which are positioned opposite the engraved zones of the corresponding engraved first cylinder corresponding to the embossing patterns of the format central zone, (b) simultaneously with stage (a1), marking the first and second plies between the first cylinder fitted with engraved and unengraved zones corresponding to the marking patterns of the peripheral zone and the first mating cylinder fitted with unengraved or engraved surface zones respectively which are situated opposite the respectively engraved and unengraved zones of the first cylinder, and (c) cutting or precutting into formats.

Another objective of the invention are apparatus implementing the methods of the invention.

In an essential feature of the invention, a first apparatus comprises:

a first set of cylinders comprising a hard, engraved cylinder and a first deforming mating cylinder, the first engraved cylinder being fitted with a first engraved zone corresponding to the embossing patterns of the central format zone of the first ply and of an engraving height $h_1$ and a second engraved zone corresponding to the marking patterns of the format peripheral zone and of an engraving height $h_2$, and a second set of cylinders comprising a hard second cylinder and a deforming second mating cylinder, the second engraved cylinder being fitted with a first engraved zone corresponding to the embossing patterns of the format central zone of the second ply and of an engraving height $h_3$ and a second unengraved zone corresponding to the peripheral format zone and of a height $h_4$, the sum of the heights $h_2$ and $h_4$ being greater than the sum of the heights $h_1$ and $h_3$.

In an essential feature of the invention, another apparatus comprises:

a first set of cylinders comprising a hard first engraved cylinder and a deforming mating cylinder, the first engraved cylinder being fitted with a first engraved zone corresponding to the embossing patterns of the format central zone for the first ply and being of an engraving height $h_1$ or $h'_1$ and a second engraved zone corresponding to the marking patterns of the peripheral format zone and of an engraving height $h_2$ or $h'_2$, and a second hard cylinder fitted with a first smooth zone corresponding to the central format zone and of an engraving height $h_3$ or $h'_3$ and a second plane zone corresponding in part or in whole to the peripheral zone and of an engraving height $h_4$ or $h'_4$, the second zone being used for positioning itself opposite the engraved zones of the first engraved cylinder corresponding to the marking patterns, the sum of the heights $h_2$ or $h'_2$ and respectively $h_4$ or $h'_4$ being greater than the sum of the heights $h_1$ or $h'_1$ and respectively $h_3$ or $h'_3$.

Another apparatus of the invention comprises the essential feature of:

a first set of cylinders comprising a hard engraved first cylinder and a deforming first mating cylinder, the first engraved cylinder being fitted with an engraved first zone corresponding to the embossing patterns of the format central zone for the first ply and being of an engraving height $h''_1$ and a second smooth zone corresponding to the peripheral format zone of an engraving height $h''_2$, $h''_2$ being less than $h''_1$, a second hard engraved cylinder fitted with a first smooth zone corresponding to the central format zone of an engraving height $h''_3$ and a second engraved zone corresponding to the marking patterns of the peripheral format zone and of an engraving height $h''_4$, where $h''_3$ is less than $h''_4$ and the sum of the heights $h''_2$ and $h''_4$ is greater than the sum of the heights $h''_1$ and $h''_3$.

In another essential feature of another apparatus of the invention, the latter comprises:

a first hard engraved cylinder fitted with engraved zones corresponding to the embossing patterns of the central format zone and engraved or unengraved zones corresponding to the marking pattern of the peripheral format zone, and a first mating cylinder fitted with unengraved zones of deforming material or engraved surfaces of hard material to respectively being positioned opposite the engraved zones of the first engraved cylinder corresponding to the embossing patterns of the central format zone, and unengraved or engraved hard surface zones to be positioned opposite the engraved or unengraved zones of the first cylinder in the zones corresponding to the marking patterns of the peripheral format zone.

Other details and advantages of the invention are elucidated in the description below and in relation to the attached drawings.

DETAILED DESCRIPTION OF PRESENTLY PREFERRED EMBODIMENTS

The product of the invention is an absorbent paper product, in particular made of tissue paper. It is cut into format size, for example into a square or rectangle.

This product may be a tissue or a paper table napkin or any similar product.

This product comprises at least two superposed and joined tissue paper plies. The product described below and illustrated in FIGS. 1 through 5B comprises two tissue paper plies.

Figure 1:
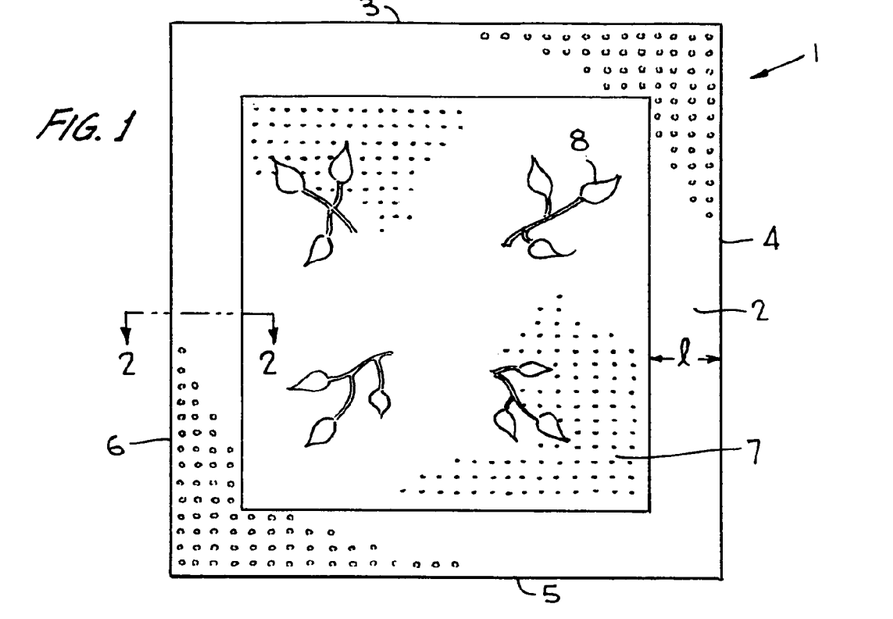
FIG. 1 is a schematic topview of a product of the invention cut to format size.

FIG. 1 is a schematic topview of a cut product 1, a table napkin or a tissue, here shown square. It comprises a peripheral zone 2 subtending a strip of a given width l along the edges 3, 4, 5 and 6 of the product 1, and a central zone 7 enclosed by the peripheral zone 2.

The two plies are joined along peripheral zone 2 of width l by marking patterns, without glueing. Depending on the particular marking technique used, the marking pattern may be constituted of simple or complex elements. It may be constituted of small surfaces in the form of disks, diamonds or others, which are implemented in a conventional manner. It also may be in the form of lines, dashes, curves constituting a design and decoration when using the marking techniques implementing a filigree as described in Patent Application WO 97/20107.

FIG. 1 shows a preferred product embodiment comprising an embossing pattern distributed over the full surface of the central zone in the form of small surfaces which, in this case, are represented by dots. Preferably, the central zone also comprises unembossed portions 8 constituting decorations and creating softer zones as regards skin contact and products used in wiping the skin, such as napkins or tissues. In another preferred embodiment, the embossing patterns of the central zone constitute decorations alternating with unembossed zones. The unembossed zones are distributed across the square central format zone so as to be symmetrical with the format medians. As a result, once the products is folded into four panes, it will offer some symmetry.

As regards the product of the invention, the plies are mechanically joined in the peripheral zone and comprise a central zone which offers bulk and touch. The various product embodiment modes are shown in the cross-sections of FIGS. 2A, 2B, 3, 4A–4G, 5A and 5B.

The elements of each FIGURE bear the same reference numerals each time increased by 100.

Figure 2A:
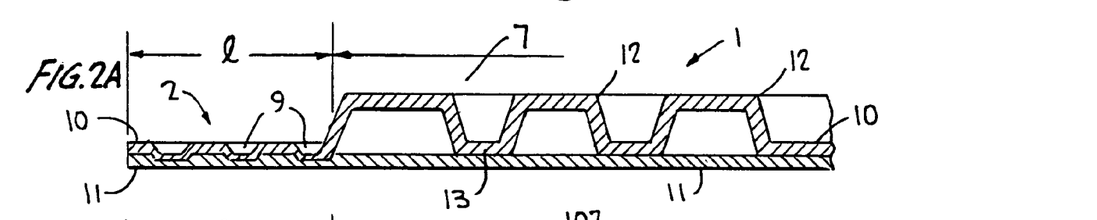
FIG. 2A is a schematic partial section along line II—II of the product of FIG. 1.

As regards FIG. 2A, the peripheral zone 2 of width l is fitted with marking patterns 9. The product thickness is less in the vicinity of these marking patterns. The first ply 10 points inward. The fibers of the first ply 10 were crushed, and the fibers of the second ply 11 were crushed also but to a lesser degree, thereby assuring the junction of the two plies. In the central zone 7, the first ply 10 is embossed with embossing patterns 12 and thus the total product thickness is increased in that zone. The most narrow parts 13 of the salients of the embossing patterns point inward in order to limit the loss of softness in these embossed zones.

Figure 2B:
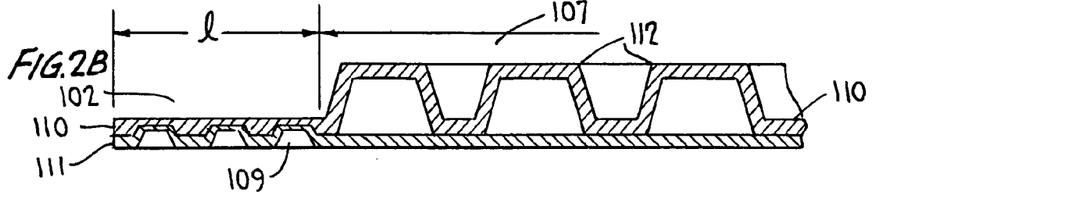
FIG. 2B is a variation of the product shown in FIG. 2A, FIGS. 3, 4A–4G, 5A, 5B each represent a schematic and partial section of other embodiments of the product of the invention.

FIG. 2B is a product variation over that shown in FIG. 2A wherein the marking patterns 109 of the peripheral zone 102 are near the level of the second ply 111 which is depressed inward. The first ply 110 is slightly depressed also. It is the first ply 110 which is fitted with the embossing patterns 112 in the central zone 107.

Figure 3:
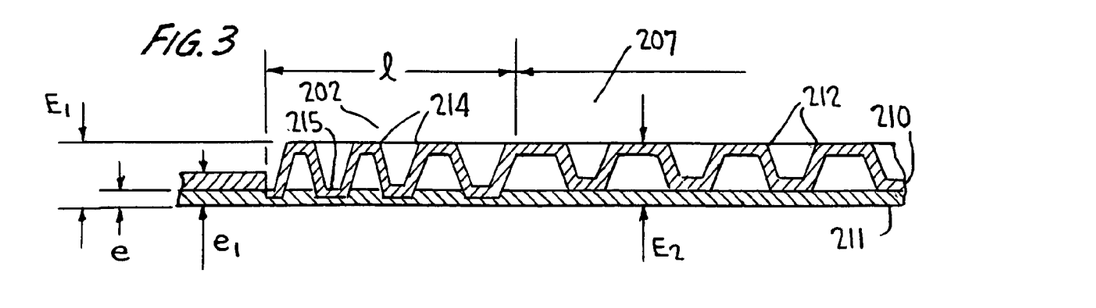

In FIG. 3, the product having a peripheral zone 202 of width l is fitted with patterns 214 which are simultaneously embossing and marking patterns. The overall product thickness $E_1$ is greater in the peripheral zone than the thickness $e_1$ of the merely superposed two plies in the absence of embossing and marking. In the trough 215 of the pattern 214, the ply 210 is depressed toward the product inside, the product thickness e in this trough which corresponds to the junction implemented by the marking of the two plies is reduced relative to the thickness $e_1$ of the two plies when superposed in the absence both of marking and embossing. In FIG. 3, and in the peripheral zone 202, the marking patterns are entirely identical with the embossing patterns. In another, implementation of the invention not shown, the marking patterns also may only be partly identical with the embossing patterns. In other words, the peripheral zone may be fitted with additional patterns that are only embossing patterns. The central zone 207 remains unchanged and solely comprises embossing patterns 212.

Figure 4A:
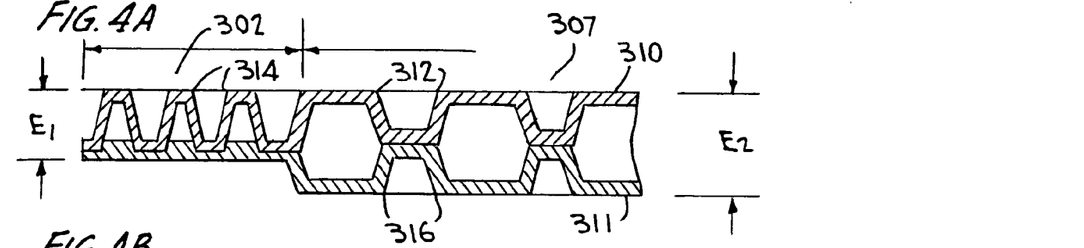

FIG. 4A illustrates another embodiment of the product of the invention. The peripheral zone is fitted with marking and embossing patterns 314 similar to those of FIG. 3. However, in the central zone, the two plies each are fitted with embossing patterns. The ply 310 is fitted with embossing patterns 312 and the ply 311 is fitted with embossing patterns 316. In FIG. 4A, the embossing patterns 312 and 316 are identical in each ply. The troughs of the embossing patterns of one ply are in the tip-to-tip position with the troughs of the patterns of the other ply. The two plies in the central zone are perfectly symmetrical in the product's cross-section. In FIG. 4A, the overall product thickness $E_2$ in the central zone is larger than the product thickness $E_1$ in the peripheral zone. In the case of FIG. 3, $E_2$ is substantially equal to $E_1$.

Figure 4B:
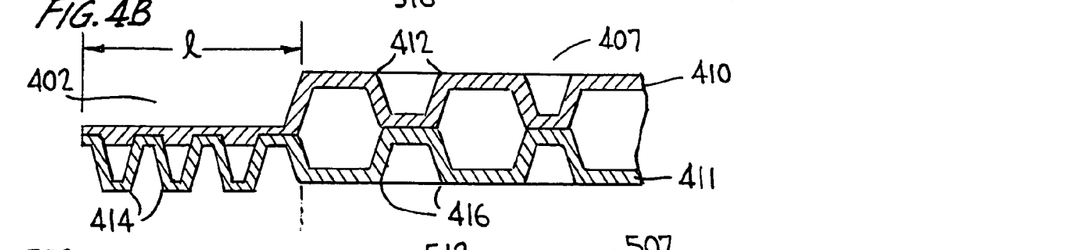

In FIG. 4B, contrary to the case of FIG. 4A, in the peripheral zone 402, it is the second ply 411 which is fitted with marking patterns identical with the embossing patterns 414, these marking patterns being impressed mainly on the second ply 411 and secondarily on the first ply 410.

In the central zone 407, the embossing patterns 412 and 416 of each of the plies 410 and 411 are identical with those denoted by 312 and 316 of the product shown in FIG. 4A.

In another implementation of the invention not shown, the embossing patterns of the central zone also may be different in each ply which no longer are symmetrical in cross-section.

Figure 4C:
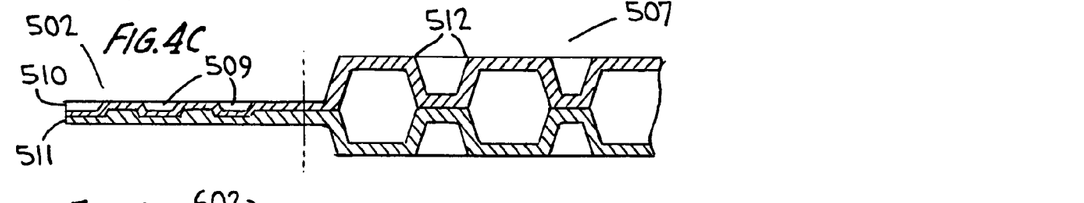
Figure 4D:
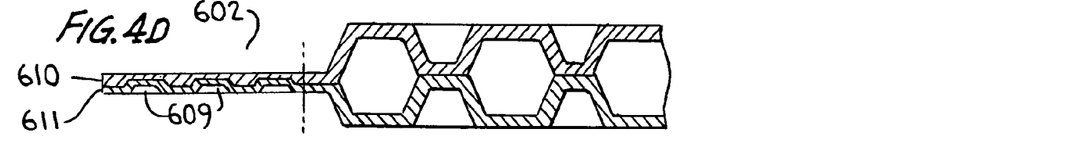

The products shown in FIGS. 4C and 4D are different from the products shown in FIGS. 4A and 4B by their peripheral zones 502 and 602 which are fitted with only a marking pattern 509 and 609, respectively, impressed mainly on the first ply 510 and secondarily on the second ply 511, and mainly on the second ply 611 and secondarily on the first ply 610. In these FIGURES, the two plies also are symmetrical in the cross-section of the central zone.

Also the two plies may be cross-sectionally asymmetrical in their central zone.

Figures 4E, 4F:
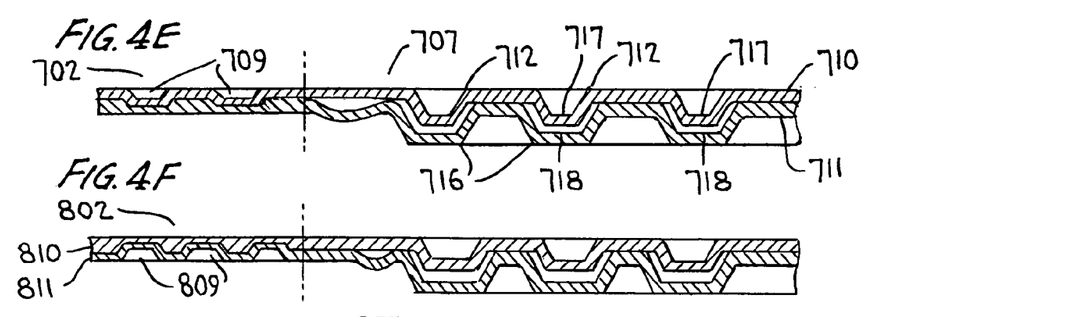

Such a product is shown in FIG. 4E. Illustratively, in the central zone 707, the troughs of the embossing patterns 712 of the ply 710 may be positioned or nested in the salient parts of the embossing patterns 716 of the other ply 711.

As shown in FIG. 4E, the two plies may not make contact everywhere with one another over their deformed surface. Part 717 of the ply 710 does not make contact with part 718 of ply 711.

In this representation, and as regards the marking patterns 709 of the peripheral zone 702, it is the first ply 710 which is depressed first. FIG. 4F shows a variation wherein the second ply 811 is first to penetrate to the level of the marking patterns 809 of the peripheral zone 802.

Figure 4G:
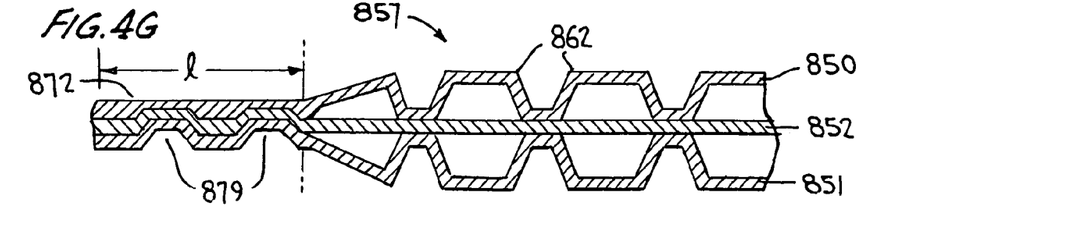

FIG. 4G illustrates a product of the invention comprising three plies. Two embossed outer plies 850 and 851 and an unembossed central ply 852. In the central ply 857, the two plies 850 and 851 each comprise embossing patterns 862 in the tip-on-tip position. In the peripheral zone 872 of width l, the three plies 850, 851 and 852 are fitted with marking patterns 879.

Figure 5A:
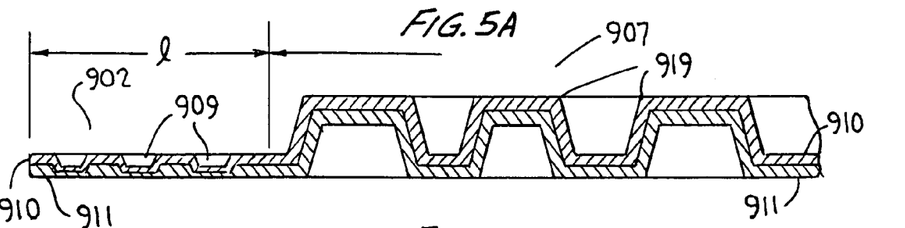
Figure 5B:
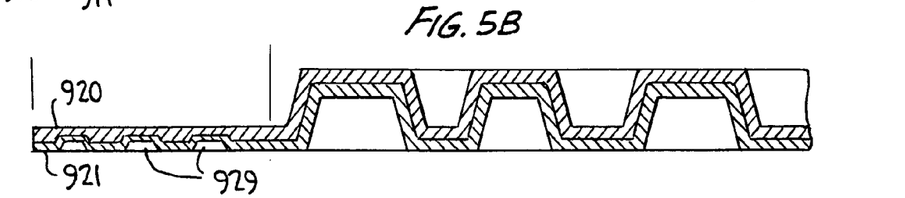

FIG. 5A illustrates a product wherein the peripheral zone 902 is fitted with marking patterns such as those described for the product of FIG. 2A. In this embodiment, the two plies 910 and 911 are fitted in their central zone with embossing patterns 919 and are joined by them. In FIG. 5A, and in the peripheral zone, the ply 910 is fitted with the marking patterns 909. Moreover, it is feasible also to mark the ply 921 as shown in FIG. 5B. The marking patterns 929 are present at the surface of the ply 921.

The above described products may be fitted in their central zone not only with embossing patterns but also with marking patterns forming filigrees constituting other decorations.

The method of the invention offers the advantage that it provides a formatted product comprising a combination of marking and embossing patterns, the peripheral zone being fitted at least with marking patterns and the central zone at least with embossing patterns. This product comprises at least two plies, the marking and embossing patterns being situated on one ply or on different plies.

The illustrations below relate to implementing the method of the invention. A particular method implementation will call for a particular implementing apparatus.

Figures 6, 6A:
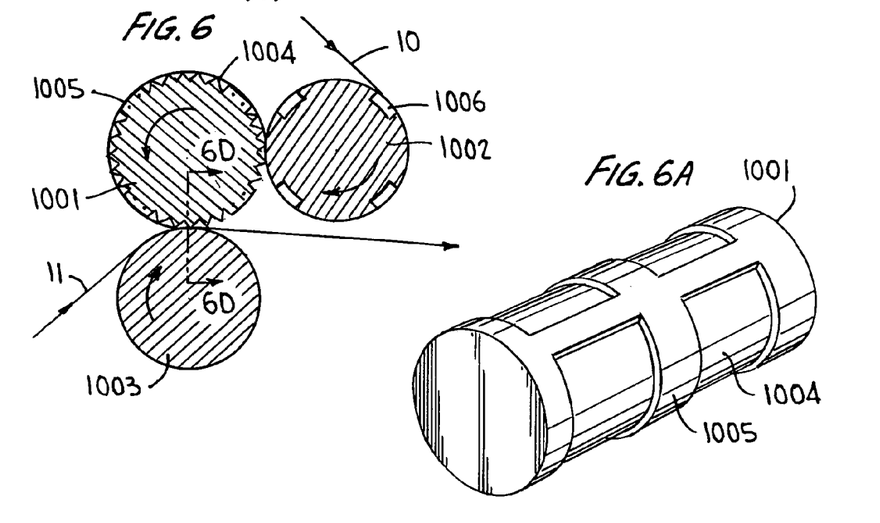
FIG. 6 illustrates an implemention of a method of the invention and implementing apparatus.
FIG. 6A shows a first engraved, hard cylinder of the apparatus of FIG. 6.

FIG. 6 shows a first and simple implementation of the method of the invention.

In the schematic shown in FIG. 6, the method includes a first stage to emboss a first tissue paper ply 10 between a first hard, engraved cylinder 1001 and a first mating cylinder 1002, in this instance made of a deforming material such as rubber, in a manner to emboss the central zone of the products of the invention at the level of the first ply. In a second stage, a second tissue paper ply 11 is superposed on the first embossed ply 10 and the two plies are marked jointly, in a way to be mutually joined, between the first hard engraved cylinder 1001 and a second hard, smooth cylinder 1003 (that is an unengraved cylinder). The first cylinder 1001 is engraved, for example, on surfaces corresponding to the peripheral zones 2 of the formatted products of the invention. Within the peripheral format zone, the two plies 10 and 11 are then subjected to the compression required to join them. This compression is applied by the system including the first engraved cylinder 1001 and the second hard smooth cylinder 1003. This principle will apply in all methods of the invention described hereafter. At the exit of this marking stage, the two plies are joined at least in the peripheral zone 2. Next, the products are cut into their formats. A product made by this method is illustrated in FIG. 2A.

The apparatus implementing the above method is illustrated by the set of three cylinders shown in FIG. 6. The first engraved cylinder 1001 is made of steel and its surface is fitted with engraved zones 1004 which correspond to the embossing patterns 12 of the central zone 7 of the formatted products. The first engraved cylinder furthermore is fitted with engraved zones 1005 situated between the engraved zones 1004 and corresponding to the marking patterns 9 of the peripheral zone 2 of the formatted products.

In this FIGURE and all FIGURES in cross-section below, the engraved zones corresponding to the marking patterns are illustrated by the presence of two dots (⌐⌐)

The mating cylinder or receiving cylinder 1002 of the first engraved cylinder 1001 is made of a deforming material such as rubber and comprises hollowed zones 1006 that will be positioned opposite the engraved zones 1005 of the first engraved cylinder 1001 corresponding to the marking patterns 9 of the peripheral zone 2 of the formatted products. The second hard cylinder 1003 is made of steel or any other undeforming material.

Figure 6B:
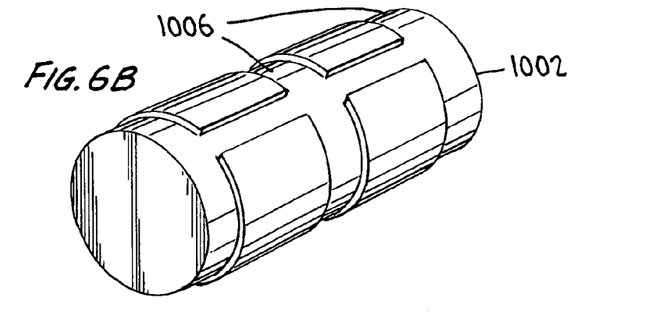
FIG. 6B shows the deforming mating cylinder of the apparatus of FIG. 6.

As regards FIG. 6A, the first hard, engraved cylinder 1001 is fitted with two engraving levels, a first level for the engraving zones 1004 corresponding to the embossing patterns 12 of the central zone 7 of the formatted products and a second level for the engraved zones 1005 corresponding to the marking patterns 9 of the peripheral zone 2 of the formatted products. As shown in FIG. 6B, the first, deforming mating cylinder 1002, made for example of rubber, comprises recessed zones 1006 that will be entered by the engraved marking zones 1005 of the first engraved cylinder 1001 when the two cylinders are mutually compressed during the embossing stage. Be it borne in mind that these engraved zones 1005 are not directly applied against the recessed zones 1006.

Figure 6C:
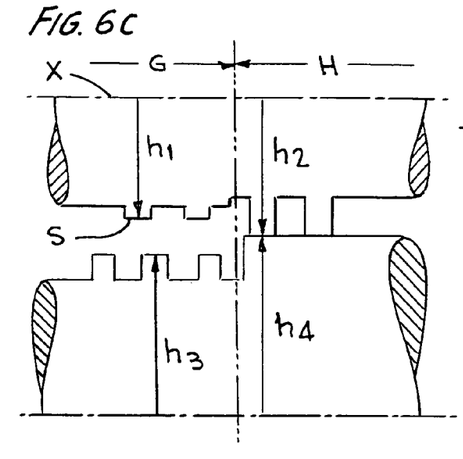
FIG. 6C is an overall, schematic partial view of the hard, engraved first cylinder applied against the second hard engraved cylinder and illustrating the heights of the engraved zones.

FIG. 6C illustrates the heights of the engraved zones of the first engraved cylinder and of the second smooth and/or engraved hard cylinder of the apparatus of the invention.

The zone G corresponds to the surface of the cylinders which emboss the central zone of the formatted products and the zone M corresponds to the cylinder surface which marks the peripheral zone of the formatted product.

The engraved zones of the cylinders comprise projecting or salient portions. Illustratively, the engraving height $h_1$ of a salient portion is defined by the distance between the surface S of this salient portion and the central cylinder axis in a direction perpendicular to the surface.

$h_1$ is the engraving height of the engraving zone of the first engraved cylinder corresponding to the embossing patterns of the central zone of the formatted products.

$h_2$ is the engraving height of the engraved zone of the first engraved cylinder corresponding to the marking patterns of the peripheral zone.

$h_3$ is the engraving height of the unengraved/engraved zone of the second hard or engraved cylinder corresponding to the central zone of the formatted product.

$h_4$ is the engraving height of the unengraved or engraved zone of the second cylinder corresponding to the peripheral zone.

Figure 6D:
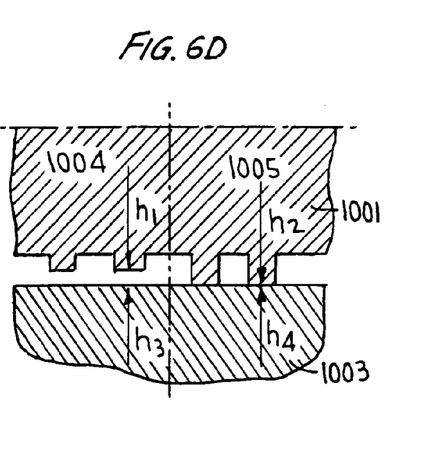
FIG. 6D is a schematic partly cross-sectional view of the first engraved cylinder applied against the second, hard, smooth engraved cylinder along line 6D—6D of FIG. 6.

FIG. 6D illustrates the heights of the various engraved zones 1004 and 1005 of the first engraved cylinder 1001 applied against the second hard cylinder 1003 of the apparatus shown in FIG. 6. The salient engraving parts are of height $h_1$ in the engraved zone 1004 corresponding to the embossing patterns 12 of the central zone 7 of the formatted products. In the engraved zone 1005 corresponding to the marking patterns 9 of the peripheral zone 2 of the formatted products, the salient engraving parts are of height $h_2$. The value of $h_2$ is greater than that of $h_1$. The heights $h_3$ and $h_4$ are equal.

Figures 7, 7A, 8:
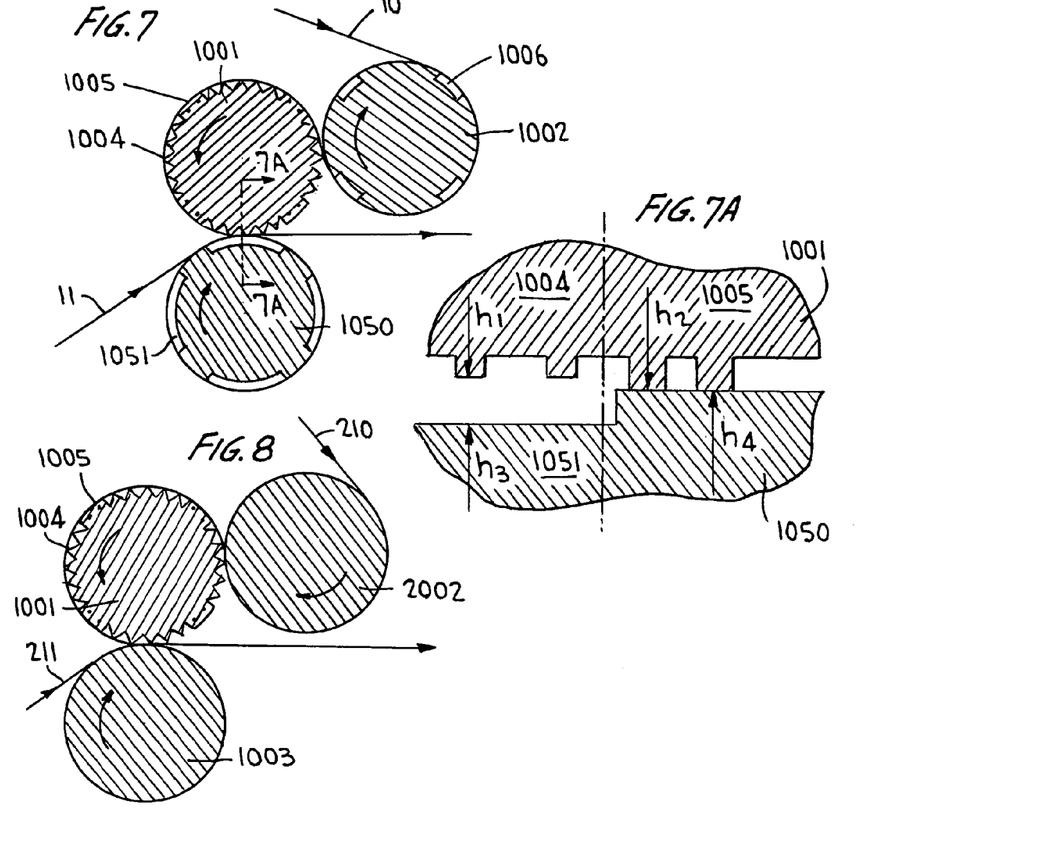
FIG. 7 shows an alternative of the apparatus of FIG. 6.
FIG. 7A is a schematic and part cross-sectional view of the first engraved cylinder applied against the second hard cylinder along line 7A—7A of FIG. 7.
FIG. 8 shows another implementation of the method of the invention and the corresponding apparatus to implement it.

FIG. 7 illustrates a variation of the apparatus of FIG. 6. The product made thereby is shown in FIG. 2A.

The method is identical to that described in relation to FIG. 6. The difference is in the second hard cylinder 1050 of the apparatus fitted with recessed, smooth zones 1051 that receive the zones 1004 of the engraved first cylinder. The zones are not directly applied against each other.

FIG. 7A illustrates the respective heights of the salient parts of the first engraved cylinder applied against the second hard cylinder of the apparatus of FIG. 7.

The first engraved cylinder 1001 in its engraved zones 1004 comprises salient parts of a height $h_1$ and in its engraved zones 1005 comprises salient parts of height $h_2$, where $h_2$ is greater than or equal to $h_1$. The second steel cylinder 1050 comprises recessed zones 1051 producing a smooth recess of height $h_3$ and a smooth portion of height $h_4$ in the zone of the cylinder 1050 that are positioned opposite the salient parts of the engraved zone 1005 of the first engraved cylinder 1001 corresponding to the marking patterns 9 of the peripheral zone 2 of the formatted products. The sum of the heights $h_2$ and $h_4$ is greater than the sum of the heights $h_1$ and $h_3$.

As regards FIG. 8, the method includes in embossing the first tissue paper ply 210 between the first hard, engraved cylinder 1001 and the first deforming mating cylinder 2002. This first ply 210 is embossed in the central zone 207 of the formatted product and also in the peripheral zone 202 of the formatted product. The second ply 211 then is folded over the first embossed ply 210 and both plies are marked between the first hard engraved cylinder 1001 and the second hard smooth cylinder 1003. In this marking stage, the two plies are marked along all or part of the embossing pattern of the first ply in the peripheral zone of the formatted product.

FIG. 3 shows a product manufactured by this method. It shows that, in the peripheral zone 202 of the formatted product, the patterns 214 are simultaneously embossing and marking patterns.

As regards the apparatus, the second hard cylinder 1003 is wholly smooth and the mating cylinder 2002 is deforming.

FIG. 6D shows the heights $h_1$ and $h_2$ of the salient parts of the engraved zones 1004 and 1005 of the first engraved cylinder 1001 applied against the second smooth hard cylinder 1003.

Figure 9:
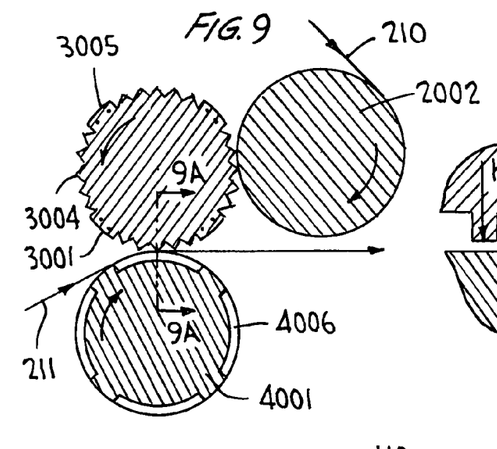
FIG. 9 is an alternative of the apparatus of FIG. 8.

The apparatus shown in FIG. 9 is a variation of that of FIG. 8. The apparatus of FIG. 9 differs by its second hard steel cylinder 4001 which comprises recessed zones 4006 that are positioned opposite the engraved zones 3004 of the first engraved cylinder 3001, corresponding to the central zone 207 of the formatted products.

Figure 9A:
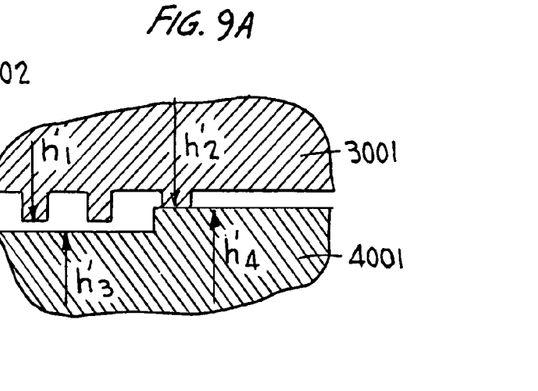
FIG. 9A is a schematic part cross-sectional view of the first engraved cylinder applied against the second hard cylinder along the line 9A—9A of FIG. 9.

The heights $h'_1$ and $h'_2$ of the salient parts of the engraved zones 3004 and 3005 of the first engraved cylinder 3001 and the heights $h'_3$ and $h'_4$ of the salient part of the second hard cylinder 4001 are shown in FIG. 9A which, in a partial cross-section along the line 9A—9A of FIG. 9, represents the configuration of the first engraved cylinder 3001 and the second hard cylinder 4001 compressed against each other during the marking stage.

$h'_2$ is less than or equal to $h'_1$, $h'_3$ is less than $h'_4$, and the sum of the heights $h'_2$ and $h'_4$ is greater than the sum of the heights $h'_1$ and $h'_3$.

The product made by this apparatus is illustrative of the one shown in FIG. 3.

Figure 10:
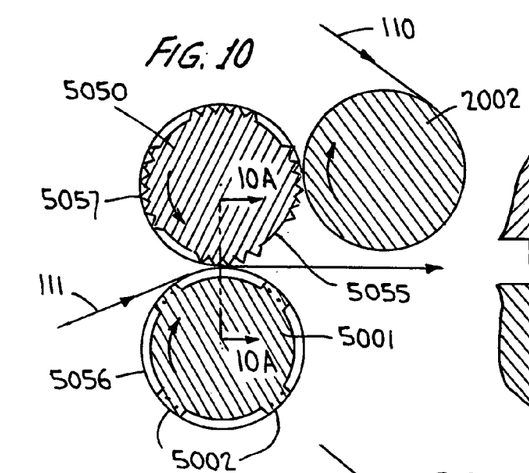
FIG. 10 shows another alternative of the apparatus shown in FIG. 8.

Contrary to the case of the apparatus of FIG. 8 and as shown in FIG. 10, the second hard cylinder 5001 can be engraved in the zones 5002 corresponding to the marking patterns 109 of the peripheral zone 102 of the formatted products. The cylinder 5050 comprises recessed smooth zones 5055 that are positioned opposite engraved zones 5002 of the second engraved hard cylinder 5001. Between the engraved zones 5002, the cylinder 5001 comprises recessed zones 5056.

Figure 10A:
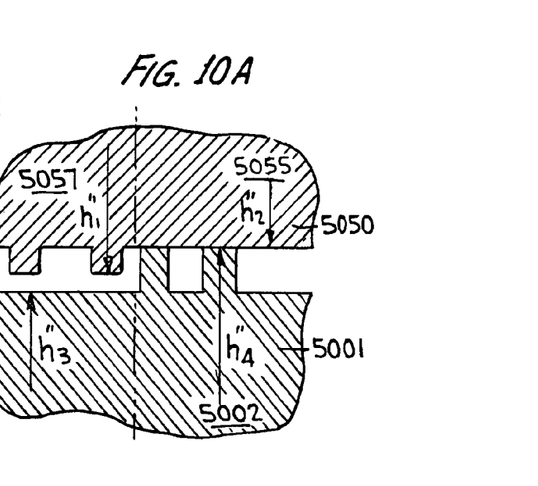
FIG. 10A is a schematic partial cross-section of the first engraved cylinder applied against the second engraved hard cylinder along line 10A—10A of FIG. 10.

FIG. 10A shows the height of the zones' salient parts: $h''_1$ for the engraved zone 5057 and $h''_2$ for the plane zone 5055 of the first engraved cylinder 5050, $h''_3$ for the plane and smooth zone 5056 and $h''_4$ for the engraved zone 5002 of the second engraved hard cylinder 5001. $h''_2$ is less than $h''_1$ and $h''_3$ is less than $h''_4$. The sum of the heights $h''_2$ and $h''_4$ is greater than the sum of the heights $h''_1$ and $h''_3$.

Accordingly, the function of the first engraved cylinder 5050 is to emboss and cooperate in marking with the second hard engraved cylinder 5002 of which in turn the sole function is to mark.

The resultant product is shown in FIG. 2B. In the peripheral zone 102 of the formatted product, it is the second ply 111 which is compressed by the cylinder 5001, and to a lesser degree the first superposed ply 110 is too.

Figure 11:
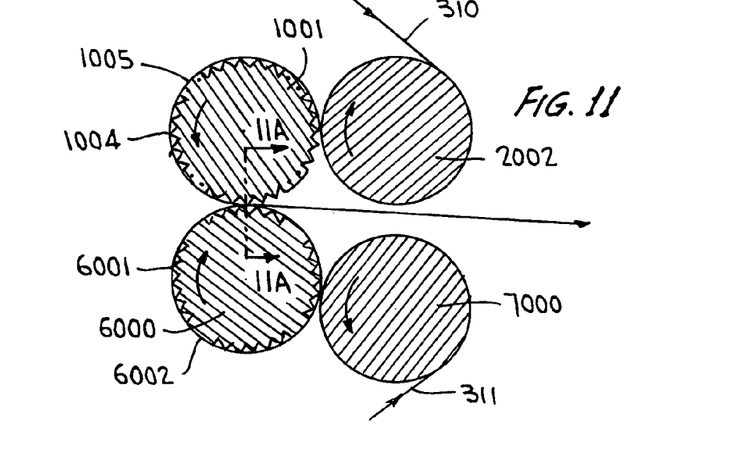
FIG. 11 illustrates another implementation of a method of the invention and an implementing apparatus.

FIG. 11 illustrates another implementing method of the invention. This method includes embossing, at least in a central zone 307 of the formatted products, the first tissue paper ply 310 between the first steel engraved cylinder 1001 and the deforming smooth mating cylinder 2002, in embossing, at least in the central zone 307 of the formatted products, the second ply 311 between the second hard engraved cylinder 6000 and a second deforming mating cylinder 7000, and then superposing the two separately embossed plies and marking them between the first engraved cylinder 1001 and the second cylinder 6000, and lastly cutting the products into their formats.

The first engraved cylinder 1001 is similar to the cylinder shown in FIG. 6A and comprises two engraving levels. A first engraving level corresponds to the engraved zone 1004 used for the embossing patterns 312 of the central zone 307 of the formatted products. The second engraving level corresponds to the engraved zone 1005 used for the marking patterns 314 which in this instance are also the embossing patterns of the peripheral zone of the formatted products.

The second engraved cylinder 6000 comprises engraved zones 6001 to emboss patterns of the central zone 307 of the second ply 311 and unengraved plane zones 6002 corresponding to the peripheral zone 302 of the formatted products.

The engravings of the zones 1004 and 6001 of the cylinder 1001 and 6000 may be identical or different. The cylinders 1001 and 6000 must be synchronized in a way to allow superposing the two embossed plies in tip-to-tip or in nested manner.

FIG. 4A shows a product made in the tip-to-tip manner. In this implementation, the product is made by embossing or engraved cylinders in the tip-to-tip position.

FIGS. 11A through 11D show various ways to distribute the engraving heights on two engraved cylinders of the apparatus of FIG. 11.

The first engraved cylinder 1001 comprises engraved zones 1004 of which the salient parts have a height $h_1$ corresponding to the embossing patterns 312 of the central zone 307 of the formatted products for the first ply and comprises engraved zones 1005 of which the salient parts have a height $h_2$ corresponding to the embossing and marking patterns 314 of the peripheral zone 302 of the formatted products.

The second engraved cylinder 6000 comprises engraved zones 6001 of which the salient parts have a height $h_3$ corresponding to the embossing patterns 316 of the central zone 307 of the formatted products for the second ply 311 and smooth, unengraved zones 6002 having a height $h_4$ and corresponding to the peripheral zone 302 of the formatted products.

Figure 11A:
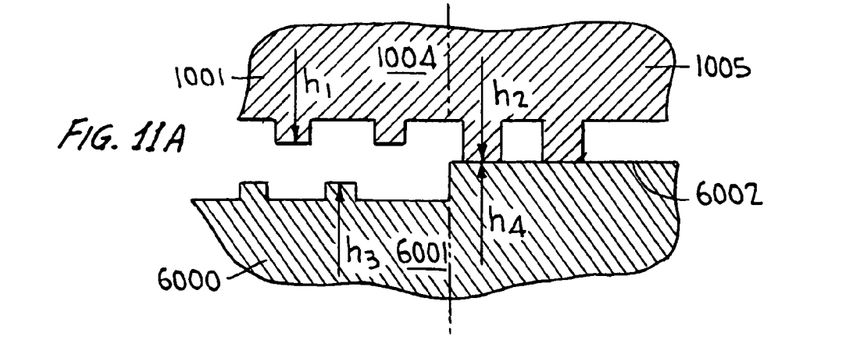
FIGS. 11A–11D are schematics of partial cross-sections of the first engraved cylinder applied against the second engraved cylinder along line 11A—11A of FIG. 11.
Figure 11B:
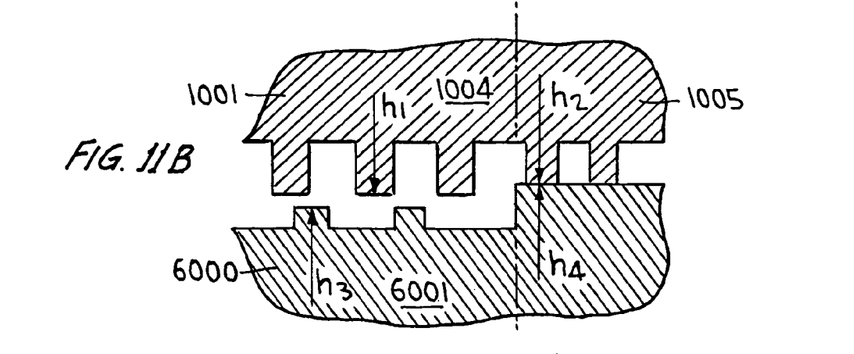
Figure 11C:
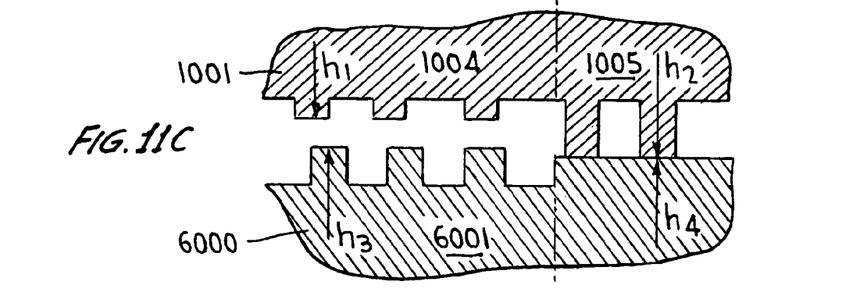

In all possible implementations shown in FIGS. 11A through 11C, the sum of the heights $h_2$ and $h_4$ is greater than the sum of the heights $h_1$ and $h_3$.

As shown in FIG. 11A, when $h_2$ equals $h_1$, $h_4$ is greater than $h_3$ and when $h_2$ is greater than $h_1$, $h_4$ is greater than or equal to $h_3$.

According to FIG. 11B, when $h_2$ is equal to $h_1$, $h_4$ is greater than $h_3$, and when $h_2$ is less than $h_1$, $h_4$ greater than or equal to $h_3$.

According to FIG. 11C, when $h_2$ is equal to $h_1$, $h_4$ is strictly less than $h_3$ and when $h_2$ is strictly larger than $h_1$, $h_4$ is less than or equal to $h_3$.

Figure 11D:
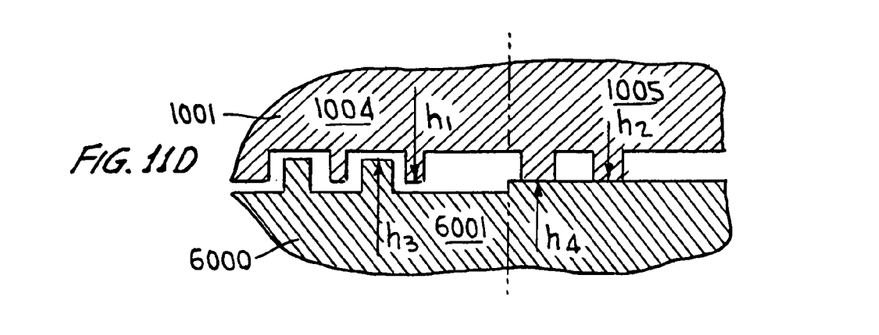

FIG. 11D illustrates the nested position in the case of joining two embossed plies using the engraved cylinders 1001 and 6000. Here $h_2$ is less than or equal to $h_1$, and $h_4$ is less than or equal to $h_3$. The sum of the heights $h_2$ and $h_4$ is greater than $h_1$ and greater than $h_3$.

By interchanging the cylinder 1001 and 6000 in FIG. 11, the product shown in FIG. 4B will be made.

Figure 12:
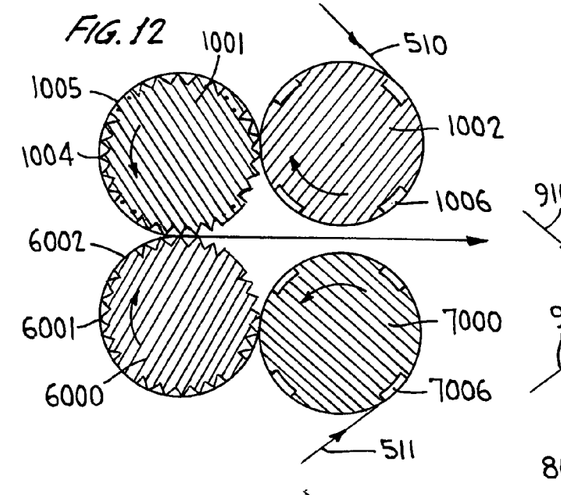
FIG. 12 shows a variation of the apparatus shown in FIG. 11.

As shown in FIG. 12, the first ply 510 is embossed in the central zone of the formatted products between the first hard engraved cylinder 1001 and the first deforming mating cylinder 1002. In parallel, the second ply 511 also is embossed between the second hard, engraved cylinder 6000, and the second deforming mating cylinder 7000 is embossed also in the central zone of the formatted products. The two plies 510 and 511 then are superposed and marked in the peripheral zone 502 of the formatted products between the first engraved cylinder 1001 and the second engraved cylinder 6000. Lastly, the products are cut into their formats.

The first engraved cylinder of the apparatus of FIG. 12 comprises the engraved zones 1004 corresponding to the embossing patterns 512 of the central zone 507 of the formatted products and further comprises engraved zones 1005 corresponding to the marking patterns 509 of the peripheral zone 502 of the formatted products.

The deforming mating cylinder 1002 comprises recessed zones 1006 which are positioned near the engraved zones 1005 of the first engraved cylinder 1001 corresponding to the marking patterns 509 of the peripheral zone 502 of the formatted products when the cylinders are mutually compressed.

Therefore, the first ply 510 is not embossed in the peripheral zone 502.

The second engraved cylinder 6000 comprises engraved zones 6001 corresponding to the embossing patterns 512 of the central zone 507 of the formatted patterns, further unengraved zones 6002 corresponding to the peripheral zone 502 of the formatted products. This smooth unengraved zones 6002 are positioned opposite the engraved zones 1005 of the first engraved cylinder 1001 which mark the peripheral zone 502 of the formatted products.

The second deforming mating cylinder 7000 also is fitted with recessed zones 7006 which are positioned near the unengraved smooth zones 6002 of the second engraved cylinder 6000 when the two cylinder are mutually compressed, whereby the second ply is also unembossed in the peripheral zone 502 of the formatted products.

The engraved cylinder 1001 may be such as shown in FIG. 6A and comprises two engraving levels. The mating cylinders 1002 and 7000 are the kind shown in FIG. 6B wherein deforming zones 1006 or 7006 are recessed.

FIGS. 11A through 11D illustrate the two engraved cylinders 1001 and 6000 in their operational positions and show the distributions of the various heights $h_1$, $h_2$, $h_3$ and $h_4$ of the salient parts of the engraved zones.

Products made by means of such a method are shown in FIGS. 4C and 4E.

When the two engraved cylinders 1001 and 6000 are in the tip-to-tip position, the resulting product is as shown in FIG. 4C. And when the two engraved cylinders 1001 and 6000 are in the nested position, the resultant product is the one shown in FIG. 4E.

By interchanging the cylinders 1001 and 6000 in FIG. 12, the resulting product will be as shown in FIGS. 4D and 4F respectively corresponding to mutually compressed engraved cylinders 6000 and 1001 in the tip-to-tip and nested positions.

Figure 13:
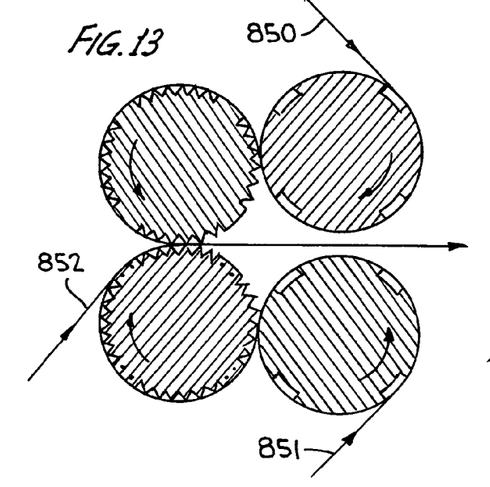
FIG. 13 shows an implementing variation of FIG. 11, wherein a third ply is used.

FIG. 13 shows a variation wherein a third smooth or embossed ply 852 enters the marking stage between the two embossed plies 850 and 851. The third ply 852 also may enter the marking stage of the methods shown in FIGS. 11 and 12.

FIG. 4G shows the product resulting from the method illustrated in FIG. 13.

Another objective of the invention is another method to simultaneously carry out the embossing and marking stages.

Figure 14:
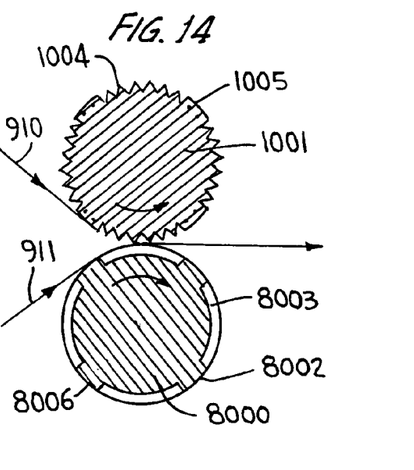
FIG. 14 shows still another way of implementing the method of the invention and its implementing apparatus.

As shown in FIG. 14, this method includes simultaneously embossing the first and second plies 910 and 911 between the first engraved cylinder 1001 and a mating cylinder 8000 at least in a central format zone 907, in simultaneously marking with the embossing stage, the first and second plies 910 and 911 between the first engraved cylinder 1001 and the second mating cylinder 8000 fitted with smooth hard surfaces 8002 in zones which correspond to the marking patterns 909 of the peripheral zone 902 and in deforming zones 8003 corresponding to the engraved embossing zones 1004.

More specifically, and as shown in FIG. 14, the first and second plies 910 and 911 are superposed and move between a hard steel engraved cylinder 1001 fitted with engraved zones 1004 corresponding to the embossing patterns 919 of the central zone 907 of the formatted products and a mating cylinder 8000 fitted with deforming, unengraved surface zones 8003, for example made of rubber, which are positioned opposite the engraved zones 1004 of the first engraved cylinder 1001 when the two cylinders 1001 and 8000 are mutually compressed to implement the method. Accordingly, the two plies 910 and 911 are jointly embossed and connected in the central zone 907 of the formatted products. In another implementing method not shown, the smooth unengraved surfaces 8003 may be replaced by hard and engraved zones.

The two plies are marked during the simultaneous motion between the engraved steel cylinder 1001 and the mating cylinder 8000. The engraved cylinder 1001 is fitted with engraved zones 1005 corresponding to the embossing patterns 909 of the peripheral zone 902 of the formatted products. The cylinder 8000 is fitted with unengraved smooth hard zones 8006. The cylinder 1001 may be engraved at two levels in the manner of the engraved cylinder of FIG. 6A.

Figure 14A:
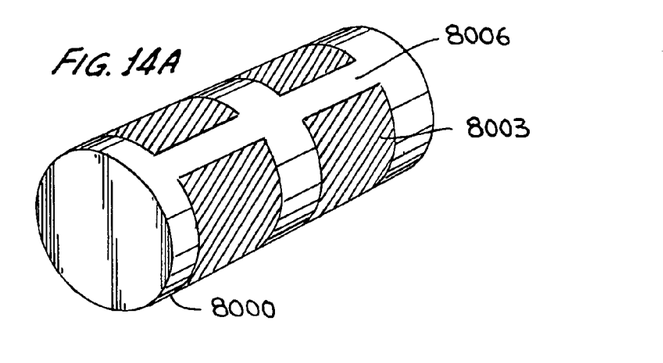
FIG. 14A shows the first engraved cylinder of the apparatus shown in FIG. 14.

On the other hand, the mating cylinder 8000 shown in FIG. 14A is made of steel or any similar material. The mating cylinder comprises recessed or hollow zones that were filled by deforming inserts 8003, for example made of rubber, to assure that the smooth mating part is deforming in the embossing stage.

The remaining surfaces 8006 of the mating cylinder 8000 are hard and smooth and cooperate in marking.

The product so made is shown in FIG. 5A.

Figure 15:
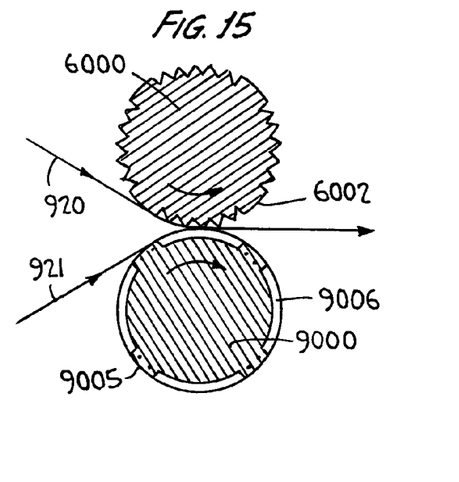
FIG. 15 shows a variation of the apparatus of FIG. 14.

As regards the apparatus of FIG. 15, it is the mating cylinder 9000 which is fitted with engraved zones 9005 corresponding to the marking patterns 929 of the peripheral zone of the formatted product. The engraved cylinder 6000 in turn is fitted with unengraved, hard zones 6002 which are positioned opposite the engraved zones 9005 of the cylinder 9000 when the two cylinders are mutually compressed to implement the method.

The cylinder 9000 furthermore is fitted with deforming inserts 9006 to provide the smooth mating part in the embossing stage.

The resultant product is shown in FIG. 5B.

In general, all the above described steel cylinders of the apparatus of the invention also may be made of other materials offering similar hardnesses and properties. Again, the mating cylinders made of any deforming material with the desired resiliency may be used.

As regards the engraved cylinders, mounted engraved plates also may be used for that portion of the engraved cylinders carrying out the central zone embossing.

Again, the cylinders made of a hard material, whether smooth or engraved, may be fitted with tread strips at the cylinder ends to limit the impacts caused by variations in pattern surfaces.

What is claimed is:

1. An absorbent paper product comprising at least two superposed plies of a format with edges, a peripheral zone along said edges, and a central zone enclosed by said peripheral zone, wherein said plies are joined together by marking patterns, composed of compacted zones on one side of said plies without corresponding salients on an opposite side of said plies, without glue at least along a segment of said peripheral zone, and wherein at least one of said at least two superposed plies has an embossing pattern in said central zone, wherein the at least two plies have a thickness along said peripheral zone which is less than the thickness of said at least two plies in the central zone, and wherein in said peripheral zone, at least one of the at least two plies has marking patterns at least partly the same as the embossing patterns.

2. Product as claimed in claim 1, wherein the marking patterns constitute filigrees.

* * * * *